United States Patent [19]
Suzuki

[11] Patent Number: 5,642,383
[45] Date of Patent: Jun. 24, 1997

[54] AUDIO DATA CODING METHOD AND AUDIO DATA CODING APPARATUS

[75] Inventor: Hiroshi Suzuki, Saitama, Japan

[73] Assignee: Sony Corporation, Tokyo, Japan

[21] Appl. No.: 684,329

[22] Filed: Jul. 19, 1996

Related U.S. Application Data

[63] Continuation of Ser. No. 85,413, Jun. 30, 1993, abandoned.

[30] Foreign Application Priority Data

Jul. 29, 1992 [JP] Japan ................................ 4-202614

[51] Int. Cl.⁶ .................................................. H04B 14/04
[52] U.S. Cl. ........................ 375/241; 375/243; 370/208; 370/210; 341/76; 348/421; 395/2.38
[58] Field of Search ............................ 375/224, 240–245, 375/254, 286; 370/208, 210; 341/51, 53, 76, 143; 348/404–405, 410, 421; 381/29–30, 34–35; 395/2.38–2.39

[56] References Cited

U.S. PATENT DOCUMENTS

| 4,535,472 | 8/1985 | Tomcik | 395/2.38 |
| 4,860,313 | 8/1989 | Shpiro | 375/245 |
| 4,862,173 | 8/1989 | Nishitani | 375/243 X |
| 4,956,871 | 9/1990 | Swaminathan | 395/2.38 |
| 5,241,535 | 8/1993 | Yoshikawa | 375/394 |
| 5,264,846 | 11/1993 | Oikawa | 381/30 |
| 5,298,899 | 3/1994 | Oh et al. | 341/76 |
| 5,301,205 | 4/1994 | Tsutsui et al. | 375/200 |

FOREIGN PATENT DOCUMENTS

| 0289080A1 | 11/1988 | European Pat. Off. | H04B 1/66 |
| 0421259A2 | 4/1991 | European Pat. Off. | H04B 1/66 |
| 4177300 | 6/1992 | Japan | G10L 7/04 |

*Primary Examiner*—Young T. Tse
*Attorney, Agent, or Firm*—Limbach & Limbach L.L.P.

[57] ABSTRACT

An audio data coding method of requantizing digital audio data in accordance with the hearing sense characteristic of the human being, comprises: the steps of calculating a quantization error; calculating a level correction value from the calculated quantization error and a level of an input signal; and carrying out level correction of the digital audio data in accordance with the level correction value. In addition, there is provided an audio data coding apparatus for implementing the above-mentioned audio data coding method.

7 Claims, 6 Drawing Sheets

AUDIO DATA CODING METHOD AND AUDIO DATA CODING APPARATUS

This is a continuation of application Ser. No. 08/085,413 filed on Jun. 30, 1993, now abandoned.

BACKGROUND OF THE INVENTION

1. Field of the Invention

This invention relates to an efficient coding method/ coding apparatus for digital audio data which are adapted for carrying out coding of input digital data by the so-called efficient coding to transmit, record, reproduce or decode coded data to provide a reproduced signal, and to a recording medium on which data formed by these coding method/ apparatus is recorded.

2. Description of the Related Art

There are various efficient coding techniques for an audio signal or a speech signal, etc. For example, in ICASSP 1980 The critical band coder—digital encoding of the perceptual requirements of the auditory system M. A. Kransner MIT, a technique is described in which the hearing sense masking is utilized to provide necessary signal-to-noise ratios every respective bands to carry out fixed bit allocation. With this technique, however, in the case of measuring the characteristic by a sine wave input, because the bit allocation is fixed, the characteristic value is not so good.

To solve such problem, there is proposed an efficient coding apparatus in which all bit which can be used for bit allocation are used in such a manner that they are divided into bits of a fixed bit allocation pattern determined in advance every small blocks and bits of a variable bit allocation pattern for carrying out bit allocation dependent upon magnitudes of signals of respective blocks to allow the divisional ratio to be dependent upon a signal related to an input signal, thus to allow the divisional ratio with respect to the fixed bit allocation pattern to be greater according as the spectrum of the signal becomes smooth to more degree.

In accordance with this method, in the case where an energy concentrates on a specific spectrum component as in the case of a sine wave input, a larger number of bits are allocated to a block including that spectrum component, thereby making it possible to remarkably improve the entire signal-to-noise characteristic. Since the hearing sense of the human being is generally extremely sensitive to a signal having a steep spectrum component, improving the signal-to-noise characteristic by using such a method not only results in improvement in a numeric value in measurement, but also is effective for improvement in the sound quality from a viewpoint of the hearing sense.

However, if allocation of bits dependent upon an input signal is carried out solely on the basis of an improvement in the signal-to-noise characteristic, in the case of attempting to compress a signal including a large number of steep spectrum components like sound of a triangle, for example, at a low bit rate, sufficient bits cannot be allocated to blocks corresponding to respective spectrum components, failing to provide a sufficient sound quality from a viewpoint of the hearing sense.

In view of this, the applicant of this invention has already proposed in the U.S. patent application Ser. No. 08/011,376 (filed on Jan. 29, 1993; now U.S. Pat. No. 5,301,205) a technique in which all bits which can be used are used in such a manner that they are divided into bits of a fixed bit allocation pattern determined in advance with respect to any short time and bits of a variable bit allocation pattern for carrying out bit allocation dependent upon the magnitudes of signals of respective blocks. Namely, bit allocation is carried out such that weighting is conducted in accordance with corresponding bands of blocks with respect to not only the fixed bit allocation pattern but also variable bit allocation pattern dependent upon magnitudes of signals of respective blocks, thus to solve the above-described problem.

Here, weighting is effective such that a larger number of bits are allocated to blocks on a lower frequency band side by taking into consideration the fact that noise on a higher frequency band side is difficult to strike or catch the ear of the human being than noise on a lower frequency band side because of sensitivity of the ear of the human being, and is apt to be masked by signals on the lower frequency band side.

On the other hand, when a signal of a large amplitude (in the vicinity of 0 dB) is inputted to compressing devices using the previously described various techniques, an overflow takes place when that signal is converted to a signal of a finite word length at the output section of the expanding device by a change of the level resulting from the influence of an error in quantization, so a higher harmonic wave by clipping is produced. This higher harmonic wave has a frequency lower than that of a signal inputted to the compressing device by aliasing when converted to an analog signal. As a result, such higher harmonic wave is recognized as noise for the human being, resulting in an obstacle from a viewpoint of the hearing sense. For such problem, there is readily conceivable a technique to make such an adjustment to amplitude-suppress or attenuate in advance a level change resulting from an error in quantization, or the like in the compressing device to thereby prevent overflow in the expanding device.

However, in a compressing device utilizing the characteristic in the hearing sense of the human being as previously described, relatively small quantization noise on a lower frequency band side and relatively great quantization noise on a higher frequency band side result from the characteristic.

Accordingly, in the case where the above-mentioned technique of suppressing or attenuating amplitude is employed, when an adjustment to such an extent capable of preventing an overflow resulting from quantization noise on the higher frequency band side is carried out, a change in the level by correction becomes equal to a quantity which cannot be neglected on the lower frequency side, i.e., in a frequency band sensitive from a viewpoint of the hearing sense of the human being, resulting in the possibility that there occurs an obstruction from a viewpoint of the hearing sense.

On the contrary, if a correction is made to such an extent that a level change by correction on the low frequency band side is negligible, there occurs the possibility that an overflow by quantization error on the higher frequency band side cannot be prevented.

Further, since quantization error in the compressing device varies at any time adaptively with respect to change in the amplitude in point of time, frequency distribution and power or energy, etc. of an input signal, correction of a maximum quantization error which can be produced must be carried out in order to completely prevent an overflow in the expanding device. Since this quantity in adjustment becomes greater with enhancement of the compression efficiency, there is the possibility that a quantity to be adjusted may be equal to a quantity which cannot be neglected as compared to the magnitude of an input signal in the efficient compression technique.

OBJECT AND SUMMARY OF THE INVENTION

This invention has been proposed in order to solve the above-mentioned problems. Namely, its object is to provide a level correction technique in which correction is made adaptively with respect to an input signal of the compressing device in such a manner that a quantity of correction is caused to be a smaller quantity of correction at the portion where quantization error produced in compression is small, i.e., in the frequency band sensitive from a viewpoint of the hearing sense of the human being and at a level sensitive from that viewpoint, and is caused to be a greater quantity of correction at the portion where quantization error is great, i.e., in the frequency band dull from a viewpoint of the hearing sense of the human being and at a level dull from that viewpoint, thereby making it possible to prevent overflow in the expanding device with respect to a large amplitude (in the vicinity of 0 dB) to suppress an increase of noise in an audible frequency band, thus to provide a satisfactory sound quality from a viewpoint of the hearing sense.

An efficient coding apparatus according to this invention is adapted to judge a quantity of quantization error followed by coding in level correction to carry out a greater level correction at the portion where quantization error is large, and to carry out a smaller level correction at the portion where quantization error is small to thereby contemplate solving the above-described problems.

Here, a level correction is more effective such that a correction value of a level determined from a quantity of quantization error is caused to be variable both on the frequency base and on the time base. Further, even if there is employed, in place of univocally determining a quantity of quantization error and a correction value, a technique to switch conversion factor of correction, e.g.,. the characteristic of the amplitude compression in consideration of amplitude information of an input signal, satisfactory result can be provided.

On the other hand, since a sudden change exerts bad influence or effect from a viewpoint of the hearing sense of the human being in changing the level correction value, if such a technique to suppress a sudden change, e.g., a technique to allow both the quantization error and the level correction value to have, e.g., hysteresis characteristic is employed, correction can be more effectively made.

In accordance with this invention, since an approach is employed to carry out level correction of audio data in dependency upon a level correction value determined from a quantization error and an input level, it is possible to suppress occurrence of noise in a low frequency band resulting from an overflow in the expanding device by the influence of quantization error in realizing efficient bit allocation in harmony with the hearing sense.

In addition, it is also possible to easily suppress, in that case, level change at the portion where the quantization error is relatively small. Accordingly, it is possible to encode a musical signal of high sound quality at a lower bit rate.

DESCRIPTION OF THE PREFERRED EMBODIMENTS

A coding method and a coding apparatus of this embodiment will now be described in detail with reference to FIGS. 1 to 7. This invention can be applied to technologies for implementing efficient coding to an input digital signal such as an audio PCM signal, etc. by using respective techniques of so called Sideband Coding (SBC), Adaptive Transform Coding (ATC) and Adaptive Bit Allocation (APC - AB).

In the efficient coding apparatus of this embodiment shown in FIG. 1, an input digital signal is divided into signals (signal components) in a plurality of frequency bands by using filters, etc. to carry out orthogonal transform processing every respective frequency bands to adaptively bit-allocate spectrum data on the frequency base thus obtained every so called critical band to be described later in which the hearing sense characteristic of the human being is taken into consideration to encode them. It is a matter of course that the frequency band divisional widths of before division into blocks by filters, etc. may be an equal divisional width.

Further, in the embodiment of this invention, in dependency upon an input signal before orthogonal transform processing, the block size (block length) is adaptively changed, and floating processing is carried out every critical band, or every respective blocks (bands) obtained by further subdividing the critical band.

The critical band mentioned above is a frequency band divided in consideration of the hearing sense characteristic of the human being, i.e., a band that a narrow band noise has when a pure sound is masked by that noise having the same intensity as that of the pure sound in the vicinity of a frequency thereof. In this critical band, according as the frequency shifts to a higher frequency band side, the band width becomes broader, and the entire frequency band of 0~20 KHz is divided into, e.g., 25 critical bands.

Figure 1:
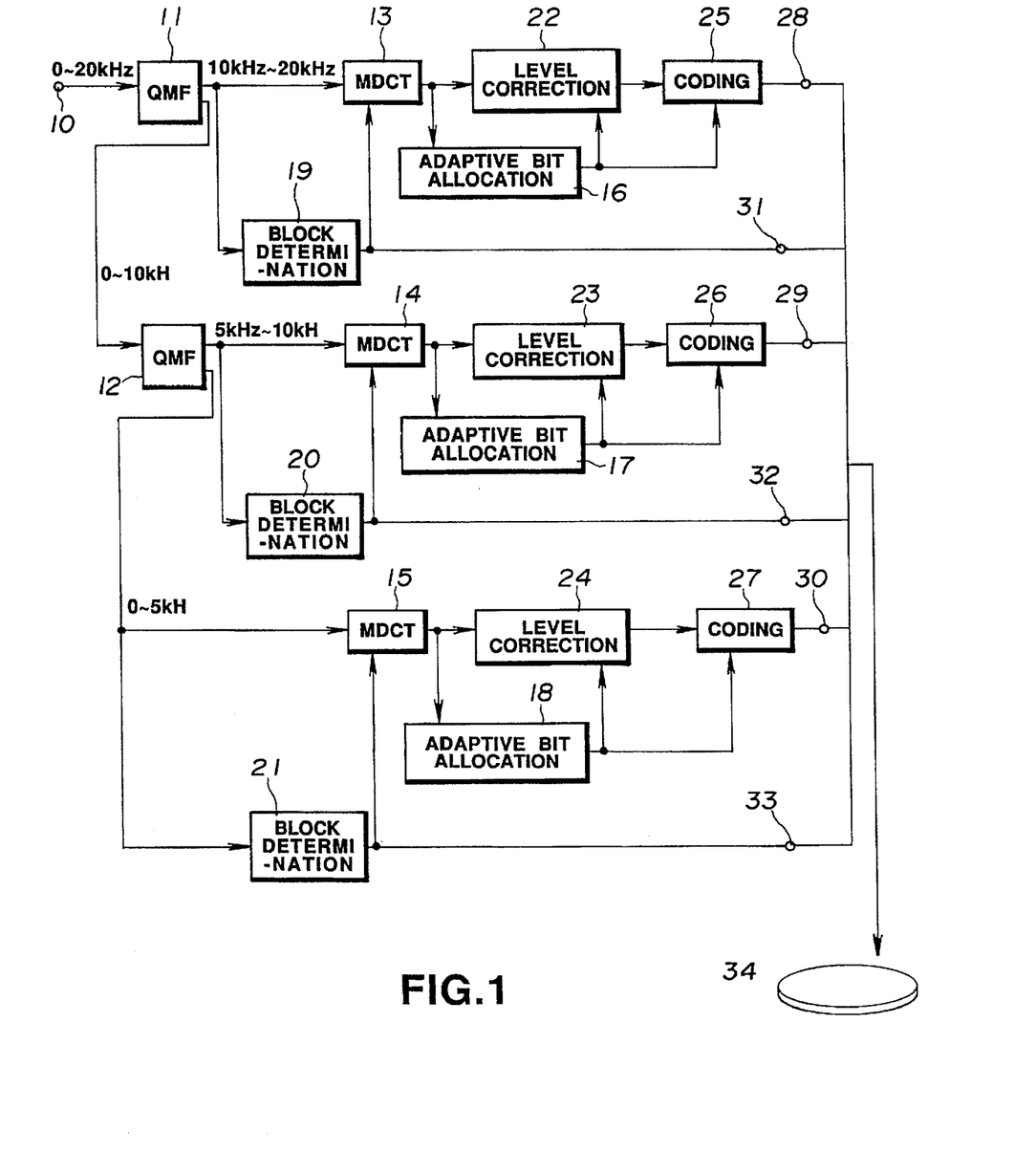
FIG. 1 is a functional block diagram showing an example of the configuration of an apparatus for implementing an efficient coding method according to this invention.

Namely, in FIG. 1, an input terminal 10 is supplied with, e.g., an audio PCM signal of 0~20 kHz. This input signal is divided into signals (signal components) in the frequency band of 0~10 kHz and the frequency band of 10 k~20 kHz by using a band division filter 11, e.g., so called a quadrature mirror filter (QMF), etc., and the signal in the frequency band of 0~10 kHz is further divided into a signal in the frequency band of 0~5 kHz and a signal in the frequency band of 5 k~10 kHz by using a band division filter 12 such as so called a QMF filter, etc.

The above-described QMF is described in R. E. Crochiere Digital coding of speech in subbands Bell Syst. Tech. J. Vol. 55, No. 8, 1976. Further, a filter division technique of equal band width is described in ICASSP 83, BOSTON Polyphase Quadrature filters—A new subband coding technique Joseph H. Rothweiler.

The signal in the frequency band of 10 k~20 kHz from the band division filter 11 is sent to a Modified Discrete Cosine Transform (MDCT) circuit 13 which is an example of an orthogonal transform circuit, the signal in the frequency band of 5 k~10 kHz from the band division filter 12 is sent to a MDCT circuit 14, and the signal in the frequency band of 0~5 kHz from the band division filter 12 is sent to a MDCT circuit 15. Thus, those signals are subjected to MDCT processing, respectively.

The MDCT is described in ICASSP 1987 Subband/ Transform Coding Using Filter Bank Designs Based on Time Domain Aliasing Cancellation J. P. Princen A. B. Bradley Univ. of Surrey Royal Melbourne Inst. of Tech. Further, orthogonal transform techniques may be used in addition to the MDCT. For example, Fast Fourier Transform (FFT), or Discrete Cosine Transform (DCT) may be used.

Figure 2:
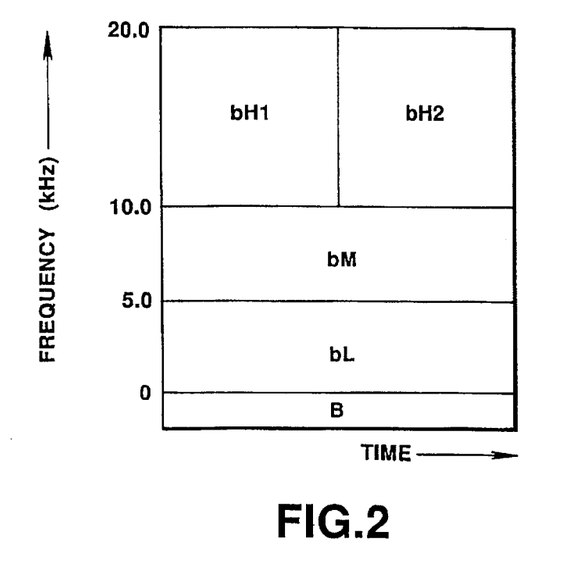
FIG. 2 is a view showing frequency division and time division of a signal in a method according to this embodiment.

Here, an actual example of the block configuration of respective MDCT circuits 13, 14, 15 is shown in FIG. 2. In the actual example of FIG. 2, according as the frequency shifts to a high frequency band side, the frequency band is widened and the time resolution is enhanced (the block length is shortened).

Namely, with respect to the signal in the frequency band of 0~5 kHz on a lower frequency band side and the signal in the frequency band of 5 k~10 kHz in a medium frequency band, MDCT processing are implemented by blocks bL and bM, respectively. On the other hand, with respect to the signal in the frequency band of 10 k~20 kHz on a higher frequency side, two times in total of MDCT processing are implemented by blocks bH1, bH2. In this embodiment, the number of orthogonal transform block samples in respective bands are caused to be the same to thereby simplify the device, and to enhance the frequency resolution on the lower frequency band side where the critical bandwidth is narrow and to enhance the time resolution on the higher frequency band side where many components (high frequency components) preferential to a transient signal are included. In the embodiment, on the assumption that a change in point of time of a signal is great, respective bands are permitted to be adaptively divided into two blocks or four blocks.

Turning back to FIG. 1, spectrum data or MDCT coefficient data on the frequency base obtained after having undergone MDCT processing in respective MDCT circuits 13, 14 and 15 are combined every critical band or every respective bands obtained by further dividing the critical band. The data thus combined are delivered to adaptive bit allocation circuits 16, 17 and 18 and level correction circuits 22, 23 and 24.

By the adaptive bit allocation circuits 16, 17 and 18, bit allocation is carried out so that there result necessary bit rates every critical band or every bands obtained by further dividing the critical band in the higher frequency band. The bit allocated data thus obtained are delivered to the level correction circuits 22, 23, 24 and the coding circuits 25, 26, 27, respectively.

The spectrum data or coefficient data on the frequency base are sent to the level correction circuits 22, 23 and 24, at which quantization errors are determined from the number of bits allocated at the adaptive bit allocation circuits, and level corrections corresponding thereto are implemented. The level corrected data thus obtained are delivered to the coding circuits. The method of correcting the level at this time may be a method of making a correction in dependency upon the magnitude of an input signal, or a method of allowing an input signal to have a fixed value irrespective of the magnitude of the input signal.

The coding circuits 25, 26 and 27 requantize spectrum data or MDCT coefficient data on the frequency base to which level correction has been implemented in dependency upon the number of bits allocated at the adaptive bit allocation circuits 16, 17 and 18. The data thus coded are taken out through output terminals 28, 29 and 30. At this time, floating information indicating which signal is normalized in regard to its magnitude and bit length information indicating bit length of information which has undergone quantization are taken out from output terminals 31, 32 and 33.

In addition, reference numerals 19, 20, 21 denote block determination circuits, respectively.

It is to be noted that data or bit length information which have been taken out from the output terminals 28~33 undergo processing a multiplexer, an error correcting processing circuit, or a modulation circuit (not shown), etc., and are then recorded onto a predetermined recording medium 34. As the recording medium 34, it is desirable that an optical disc, or a magneto-optical disc is used, and a magnetic disc or a magnetic tape may be used. In addition, data is not only recorded onto a recording medium 34, but also may be transmitted through a predetermined communication path.

Figure 3:
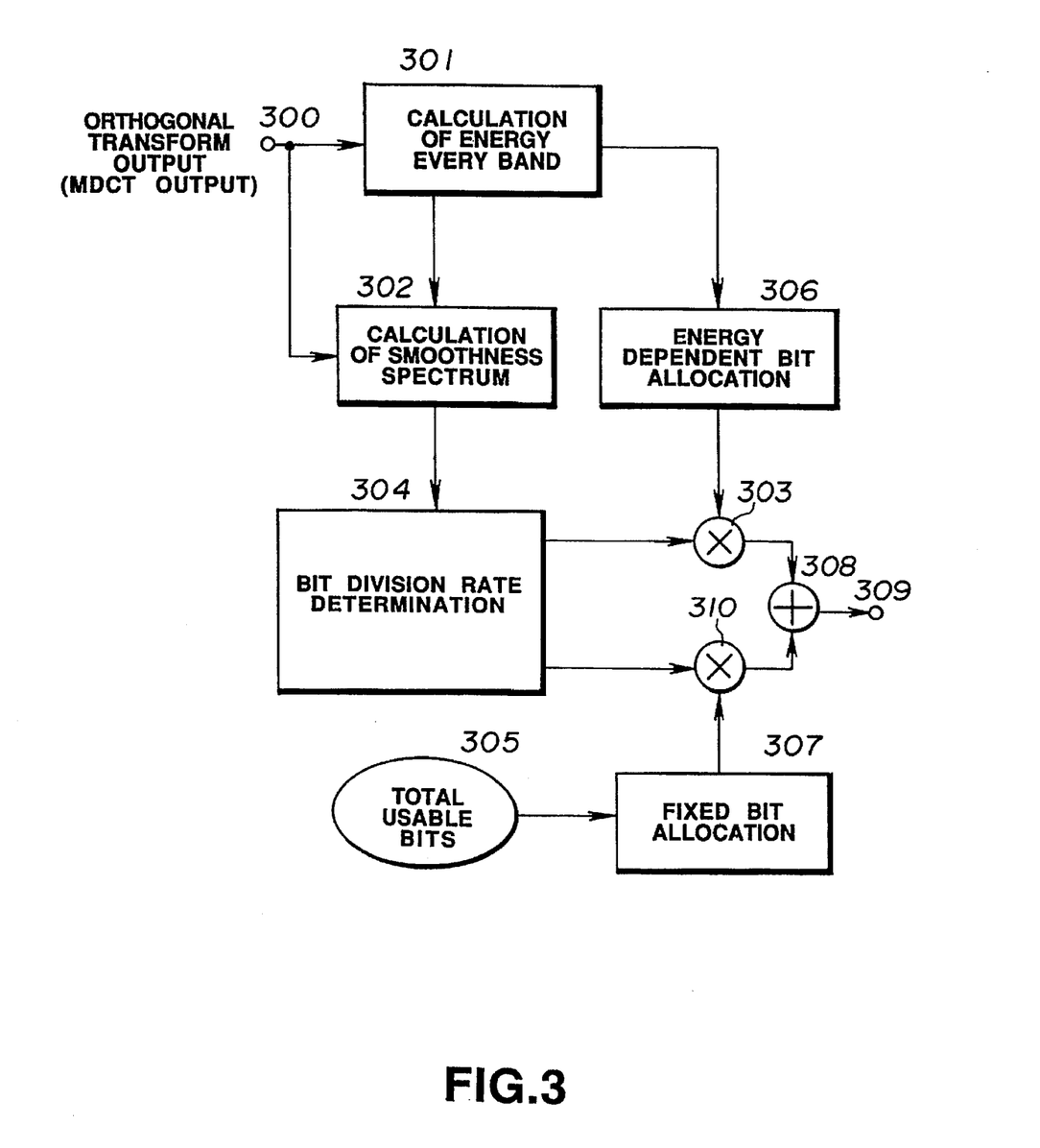
FIG. 3 is a functional block diagram showing an example of the configuration of adaptive bit allocation means in the method of this embodiment.
Figure 4:
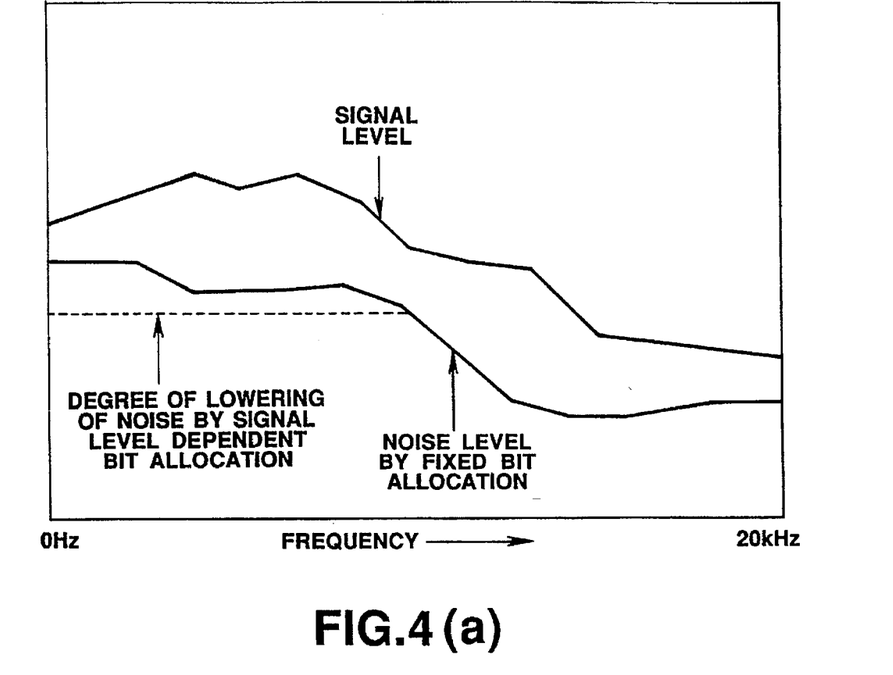
FIGS. 4(a) and 4(b) are a view for explaining an example of an adaptive bit allocation in the case where spectrum components are disperse in the method of this embodiment.
Figure 5:
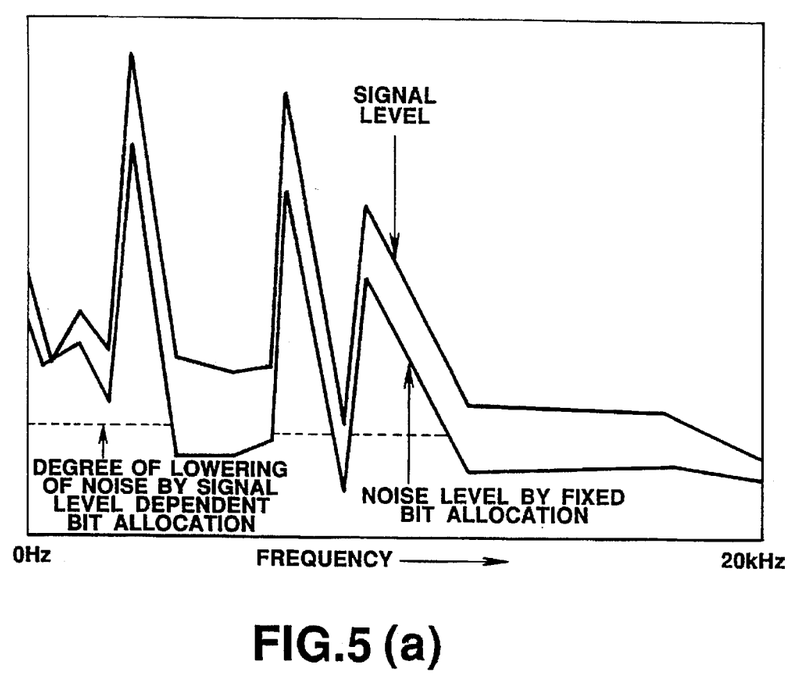
FIGS. 5(a) and 5(b) are a view for explaining an example of an adaptive bit allocation in the case where spectrum is in a concentrate in the method of this embodiment.

FIG. 3 is a circuit diagram showing, in a block form, the outline of the configuration of an actual example of the adaptive bit allocation circuits 16, 17 and 18.

MDCT coefficients from the MDCT circuits 13, 14 and 15 in FIG. 1 are inputted to a circuit 301 for calculating an energy every band and a circuit 302 for calculating smoothness of spectrum. The circuit 301 for calculating an energy every band calculates, every respective bands, the maximum value within a corresponding band as a power in the corresponding band to deliver it to an energy dependent bit allocation circuit 306 and the spectrum smoothness calculation circuit 302. The energy dependent bit allocation circuit 306 determines a relative ratio of bit allocation on the basis of energies of signals in respective bands.

On the other hand, the spectrum smoothness calculation circuit 302 calculates from the energies of signals in respective bands and MDCT coefficients whether or not the spectrum components concentrate on a portion, or are dispersed as in the case of white noise to deliver its result to a bit division ratio determination circuit 304. The bit division ratio determination circuit 304 determines a ratio between bits of the fixed bit allocation and bits of the energy dependent bit allocation on the basis of smoothness of spectrum. In accordance with this ratio, the energy dependent bit allocation data and the fixed bit allocation data are respectively multiplied by the multipliers 303 and 310 by coefficients. The data thus obtained are added by an adder 308, and the added result thus obtained is outputted from an output terminal 309.

It is to be noted that there may be employed as an example of application where the above-mentioned energy dependent bit allocation is caused to be zero at all times, viz., bit allocation is carried out by the bit allocation fixed at all times, thereby permitting the apparatus to be simplified.

The operation of the respective circuits in FIG. 3 will now be described. When it is assumed that the total usable bits 305 representing MDCT coefficients which can be used in transmission or recording is 100 kbps, a pattern of bit allocation corresponding to 100 kbps which can be used is to be prepared. In the embodiment, a pattern of bit allocation using 100 kbps is prepared in advance as a fixed bit allocation 307. A plurality of bit allocation patterns of the fixed bit allocation are prepared. Any one of these patterns can be desirably selected depending upon the property of a signal used. In this embodiment, there are prepared various patterns in which quantities of bits of blocks of short time corresponding to 100 kbps are distributed to respective frequencies. Particularly, in this embodiment, there are prepared a plurality of patterns where the bit allocation rate in the low and medium frequency bands and the bit allocation rate in the high frequency band are caused to be different.

An approach is employed such that according as the magnitude of a signal becomes smaller, a pattern having a lesser quantity of bits allocated to the higher frequency band is selected. Thus, a loudness effect such that according as the signal becomes smaller, the sensitivity of a signal in the high frequency band lowers to more degree is exhibited. As the magnitude of a signal at this time, although the magnitude of a signal in the entire band can be used, an output of a circuit for dividing a frequency band before division of band in which a filter, etc. is used, or a MDCT output can be utilized. The division ratio between allocation to the fixed bit allocation pattern and the bit allocation dependent upon bark spectrum is determined by an index indicating smoothness of a signal spectrum.

In this embodiment, a value obtained by dividing the sum of absolute values of differences between adjacent values of signal spectra by the sum of signal spectra is used as an index. Then, the sum of the value of the fixed bit allocation and the value of bit allocation dependent upon spectra every critical band or every band obtained by further dividing the critical band is taken in the adder 308. This sum is used in quantization.

The state of the bit allocation at this time is shown in FIGS. 4(a) and 5(a). In addition, the state of quantization noise corresponding thereto is shown in FIGS. 4(b) and 5(b).

FIG. 4(a) illustrates a relatively flat signal spectrum. FIG. 4(a) also shows the noise level when represented by a fixed bit allocation. The broken line in FIG. 4(a) shows the degree of noise lowering by signal dependent bit allocation. The bit allocation by a large number of fixed bit allocation serves to take a large signal-to-noise ratio over the entire frequency band. However, since the importance of this band is small from a viewpoint of the hearing sense in the low and high frequency bands, a relatively smaller number of bit allocation is used. At the same time, by carrying out bit allocation slightly dependent upon signal level, the noise level in the frequency band where the magnitude of a signal is large is selectively lowered. However, in the case where the signal spectrum is relatively flat, this selectivity is effective over a relatively broad frequency band. FIG. 4(b) illustrates the resulting bit allocation with the quantity of bits allocated by the fixed bit allocation shown with respect to the quantity of bits allocated with respect to the signal dependent bit allocation.

FIG. 5(a) illustrate a signal spectrum where the signal indicates high tonality. The signal level includes a number of peaks at various frequencies. FIG. 5(a) also represents the noise level produced by fixed bit allocation. The bit allocation of the present invention provides an additional quantity of bits at the frequency peaks when using the signal dependent bit allocation as shown in FIG. 5(b). Thus, an improvement in the characteristic in an isolated spectrum input signal is performed. At the same time, by carrying out bit allocation by a slight fixed bit allocation, the noise level in a broad band is lowered in a non-selective manner.

An actual configuration of respective level correction circuits 22, 23 and 24 and the operation thereof will now be described with reference to FIG. 6.

Figure 6:
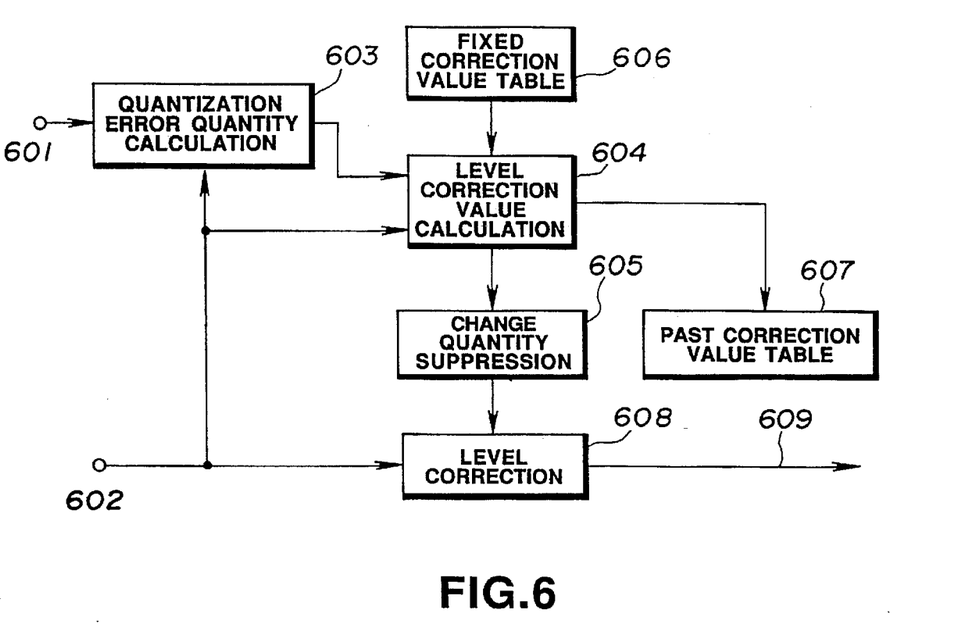
FIG. 6 is a functional block diagram showing an example of level correction means in the apparatus for implementing the method of this embodiment.

In FIG. 6, outputs of respective MDCT circuits 13, 14 and 15 in FIG. 1 are delivered to an input terminal 602.

Namely, outputs from the respective MDCT circuits 13, 14 and 15 are delivered to a level correction circuit 608, a level correction value calculation circuit 604, and a quantization error calculation circuit 603 through the input terminal 602. On the other hand, outputs of the respective adaptive bit allocation circuits 16, 17 and 18 in FIG. 1 are delivered to the quantization error calculation circuit 603 through an input terminal 601 in FIG. 6. This quantization error calculation circuit 603 calculates a quantization error from outputs of the adaptive bit allocation circuits 16, 17 and 18 and outputs of the MDCT circuits 13, 14 and 15. Namely, the quantization error calculation circuit 603 calculates a quantization error from the number of bits allocated with respect to the magnitude of spectrum.

An output of the quantization error calculation circuit 603 is delivered to the level correction value calculation circuit 604 together with outputs of the MDCT circuits 13, 14 and 15, at which level correction values are calculated every respective spectra from the magnitude of spectrum and the quantization error. At this time, a correction value may be calculated every band where several spectra are combined. At the same time, information for correcting a peculiar fixed error that the device has irrespective of compression, such as, for example, an error resulting from an operation by a finite word length, an error resulting from a convolution operation to carry out an operation limited to the finite number of times, or the like are outputted from a fixed correction value table 606. This fixed correction value table 606 may be omitted in the case where an error peculiar to the device is so small that is negligible as compared to quantization error.

The level correction value thus calculated is delivered to a change quantity suppression circuit 605 and a past correction value table 607. The change quantity suppression circuit 605 serves to reduce sense of incompatibility from a viewpoint of the hearing sense of the human being by a sudden level correction. Namely, a past correction value is outputted from the past correction value table 607, and is compared with an output of the level correction value calculation circuit 604. As a result, in the case where there is a change above a predetermined value, the level correction value is modified (changed). It is apparent that the correcting method at this time may be carried out at a fixed rate, or may be carried out by a specific characteristic like so called hysteresis, or an approximate expression such as a mean or a root mean square, etc., of correction quantities of adjacent compression blocks. In addition, it is necessary that information stored in the past correction value table 607 has a sufficiently large time length as compared to the compression time block. While that information has a capacity of, e.g., five blocks in this embodiment, such a capacity may be increased or decreased depending upon an example of application.

The level correction value which has undergone modification by the change quantity suppression circuit 605 is inputted to the level correction circuit 608. At the level correction circuit 608, the levels of outputs of the MDCT circuits 13, 14 and 15 in FIG. 1 inputted from the input terminal 602 are corrected. The outputs thus corrected are outputted from an output terminal 609. These outputs are inputted to the coding circuits 25, 26 and 27 in FIG. 1. It is to be noted that correction of the level at this time may be carried out every critical band or every block floating band, or may be carried out every plural bands divided by making use of a required number of filters, etc.

It is to be noted while, in the embodiment, the level correction circuits 22, 23 and 24 and the coding circuits 25, 26 and 27 are respectively constituted as separate circuits, they can be easily constructed as the same circuit of one chip, for example.

The effect in the coding method and the coding apparatus of the embodiment according to this invention will now be described with reference to FIG. 7.

Figure 7A:
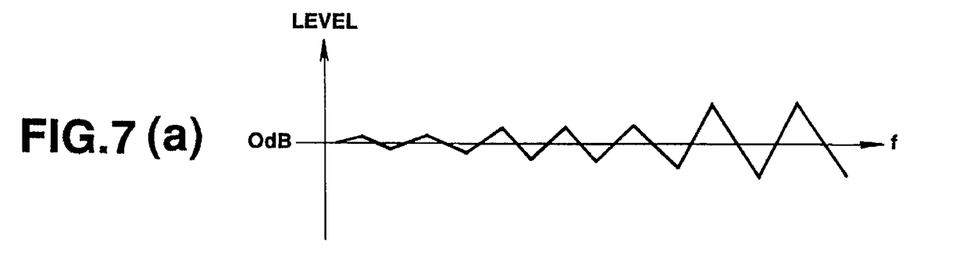
FIGS. 7(a) to 7(c) are a view showing an example of effects obtained with this invention.
Figure 7B:
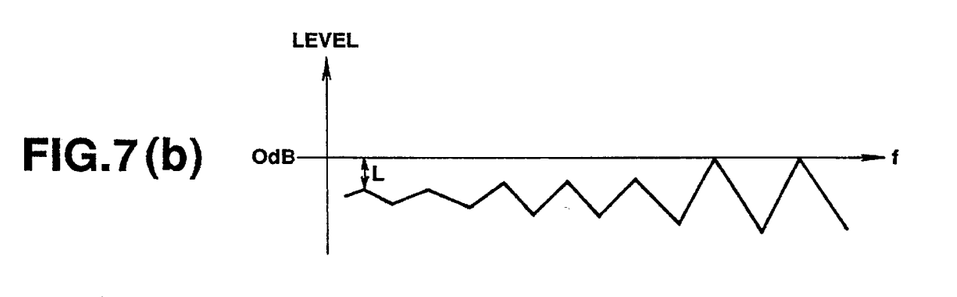

For example, FIG. 7(a) shows an example of a waveform of a decoding operation result. As shown in this example, in the case where quantization is carried out such that a quantization error in a low frequency band where noise is easy to be heard by the human being, or the masking effect cannot be expected to much degree is caused to be small, and quantization is carried out such that a quantization error in a higher frequency band where noise is difficult to be heard by the ear of the human being or the masking effect can be expected to much degree is caused to be large, if a fixed level correction is made irrespective of frequency, i.e., a level correction of a quantity capable of preventing an overflow in a higher frequency band, a level change L in the low frequency band where the quantization error is small becomes equal to the order of a large value which cannot be neglected as indicated by the waveform of the decoding operation result of FIG. 7(b).

Figure 7C:
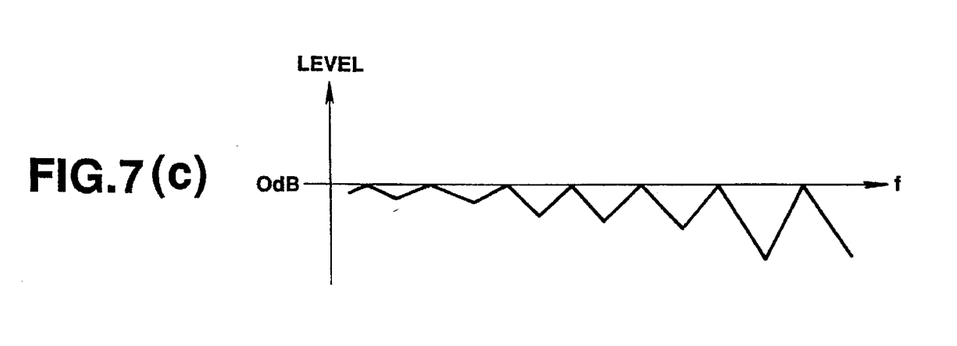

In view of this, when the coding method of the embodiment of this invention is used, a level correction corresponding to a quantization error is carried out every respective bands, whereby the level change in the low frequency band becomes equal to the order of a negligible value as shown in FIG. 7(c). At this time, there results a difference between the level in the low frequency band and the level in the high frequency band. However, since the original quantization error value is determined by application of the hearing sense characteristic of the human being, such a level difference does not become a great problem from a viewpoint of the hearing sense.

As apparent from the foregoing description, in accordance with the level correction technique according to this invention, not only occurrence of noise by clipping at the time of inputting a signal of a large amplitude is efficiently suppressed, but also the level change in such suppression can be caused to fall within a value preferable from a viewpoint of the hearing sense of the human being. Thus, a compact and high sound quality efficient coding/decoding apparatus can be realized.

What is claimed is:

1. A method for processing spectral components of an audio signal to generate level corrected spectral components of the audio signal, the method comprising the steps of:
   a. calculating a quantization error quantity based upon the spectral components of the audio signal and a bit allocation, the quantization error quantity representative of a quantization error that would result from quantizing the spectral components of the audio signal utilizing the bit allocation;
   b. calculating a level correction value from the calculated quantization error quantity and a magnitude of the spectral components of the audio signal; and
   c. carrying out level correction of the spectral components of the audio signal, responsive to the level correction value, to generate the level corrected spectral components.

2. The method as set forth in claim 1, and which further comprises a step of:
   d. providing a predetermined correction value, wherein, in the step b. of calculating the level correction value, the level correction value is calculated from the predetermined correction value in addition to being calculated from the calculated quantization error quantity and the magnitude of the spectral components of the audio signal.

3. The method as set forth in claim 1, further including a step of:
   e. adjusting the level correction value relative to at least one previously determined level correction value such that level correction changes at a rate that has a predetermined characteristic.

4. An apparatus for processing spectral components of an audio signal to generate level corrected spectral components of the audio signal, comprising:
   a. quantization error quantity calculation means for calculating a quantization error quantity based upon the spectral components of the audio signal and a bit allocation, the quantization error quantity representative of a quantization error that would result from quantizing the spectral components of the audio signal utilizing the bit allocation;
   b. level correction value calculation means for calculating a level correction value from the calculated quantization error quantity and a magnitude of the spectral components of the audio signal; and
   c. level correction means for carrying out level correction of the spectral components of the audio signal, responsive to the level correction value, to generate the level corrected spectral components.

5. The apparatus as set forth in claim 4, and which further comprises:
   d. means for providing a predetermined correction value, wherein the level correction value calculation means calculates the level correction value from the predetermined correction value in addition to calculating the level correction value from the calculated quantization error quantity and the magnitude of the spectral components of the audio signal.

6. A recording medium on which a coded audio signal is recorded, the coded audio signal being generated, before being recorded, by a method comprising steps of:
   a. generating the spectral components of an audio signal;
   b. calculating a quantization error quantity based upon the spectral components of the audio signal and a bit allocation, the quantization error quantity representative of a quantization error that would result from quantizing the spectral components of the audio signal utilizing the bit allocation;
   c. calculating a level correction value from the calculated quantization error quantity and a magnitude of the spectral components of the audio signal;
   d. carrying out level correction of the spectral components of the audio signal, responsive to the level correction value, to generate level corrected spectral components; and
   e. coding the level corrected spectral components based upon the bit allocation to generate coded level corrected spectral components, wherein the coded level corrected spectral components constitute the audio signal recorded on the recording medium.

7. The recording medium as set forth in claim 6, wherein said recording medium is a disc.

* * * * *